(12) United States Patent
Borg et al.

(10) Patent No.: US 9,015,034 B2
(45) Date of Patent: Apr. 21, 2015

(54) METHODS AND DEVICES FOR GENERATING AN ACTION ITEM SUMMARY

(75) Inventors: Carl Magnus Borg, San Francisco, CA (US); Lars Johan Anders Olsson, San Francisco, CA (US); John Cross Neumann, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 379 days.

(21) Appl. No.: 13/472,295

(22) Filed: May 15, 2012

(65) Prior Publication Data

US 2013/0311167 A1 Nov. 21, 2013

(51) Int. Cl.
*G06F 17/27* (2006.01)
*G06Q 10/10* (2012.01)

(52) U.S. Cl.
CPC .................................. *G06Q 10/109* (2013.01)

(58) Field of Classification Search
CPC ......... G06F 17/20; G06F 17/21; G06F 17/27; G06F 17/277; G06F 17/28; G06F 17/30
USPC ............................................ 704/1, 9, 2, 3, 10
See application file for complete search history.

(56) References Cited

U.S. PATENT DOCUMENTS

| 2003/0074196 | A1  | 4/2003  | Kamanaka |
|---|---|---|---|
| 2005/0246726 | A1* | 11/2005 | Labrou et al. ................. 719/328 |
| 2009/0210225 | A1  | 8/2009  | Simpson et al. |
| 2010/0250367 | A1* | 9/2010  | Smith et al. ................ 705/14.58 |
| 2012/0216115 | A1* | 8/2012  | Lorenceau .................... 715/704 |
| 2013/0085859 | A1* | 4/2013  | Sim et al. ................... 705/14.58 |

FOREIGN PATENT DOCUMENTS

| WO | 2005122538 A2 | 12/2005 |
|---|---|---|
| WO | 2007033465 A1 | 3/2007 |

OTHER PUBLICATIONS

Extended European Search Report mailed Oct. 8, 2013, in corresponding European patent application No. 12174628.3.
CIPO, CA Office Action relating to application No. 2,810,193 dated Dec. 19, 2014.

* cited by examiner

*Primary Examiner* — Qi Han
(74) *Attorney, Agent, or Firm* — Fish & Richardson P.C.

(57) ABSTRACT

Methods and devices for generating an action item summary are described. In one example embodiment, the present application describes a processor-implemented method. The method includes: receiving a request for creation of an action item, the action item comprising a record of a proposed future action; obtaining context information associated with the action item; storing the action item and context information; and generating a sentence describing the action item based on the context information associated with the action item.

21 Claims, 10 Drawing Sheets

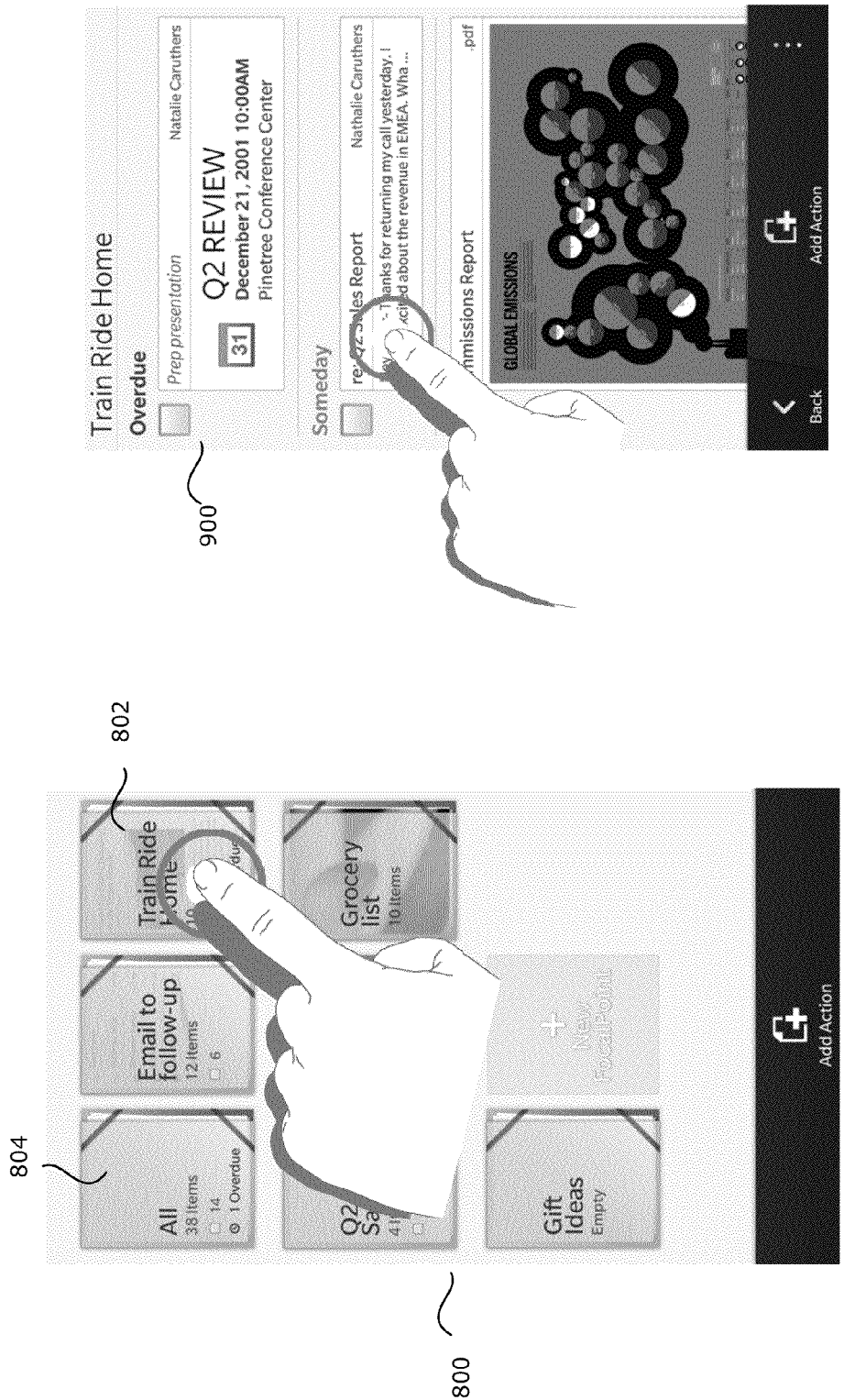

METHODS AND DEVICES FOR GENERATING AN ACTION ITEM SUMMARY

TECHNICAL FIELD

The present application relates to information managers and, more particularly, to methods and electronic devices for automatically generating a summary of an action item associated with an information manager.

BACKGROUND

A personal information manager (PIM) is an application that functions as an organizer of information for a user. Personal information managers often organize addresses, personal notes and journal entries, tasks, reminders, archived email messages, etc.

Personal information managers often allow a user to create tasks. Tasks may, for example, be to-do items. That is, a task may be a record of an action that a user wishes to perform or complete. Tasks may be manually input into the personal information manager by a user. For example, a user may use a keyboard to manually compose the task. Some personal information managers may allow the task to be associated with a date and a reminder of the task to be generated based on the date. Tasks may be presented in a list (which may be referred to as a to-do list) which may include other tasks.

Personal information managers may provide a very limited set of management functions and may rely heavily on user input for task creation. There is a need for improved personal information managers.

BRIEF DESCRIPTION OF THE DRAWINGS

Reference will now be made, by way of example, to the accompanying drawings which show example embodiments of the present application, and in which:

FIG. 8 is an example display screen in accordance with example embodiments of the present disclosure;

FIG. 9 is an example display screen in accordance with example embodiments of the present disclosure;

Like reference numerals are used in the drawings to denote like elements and features.

DETAILED DESCRIPTION

Figure 1:
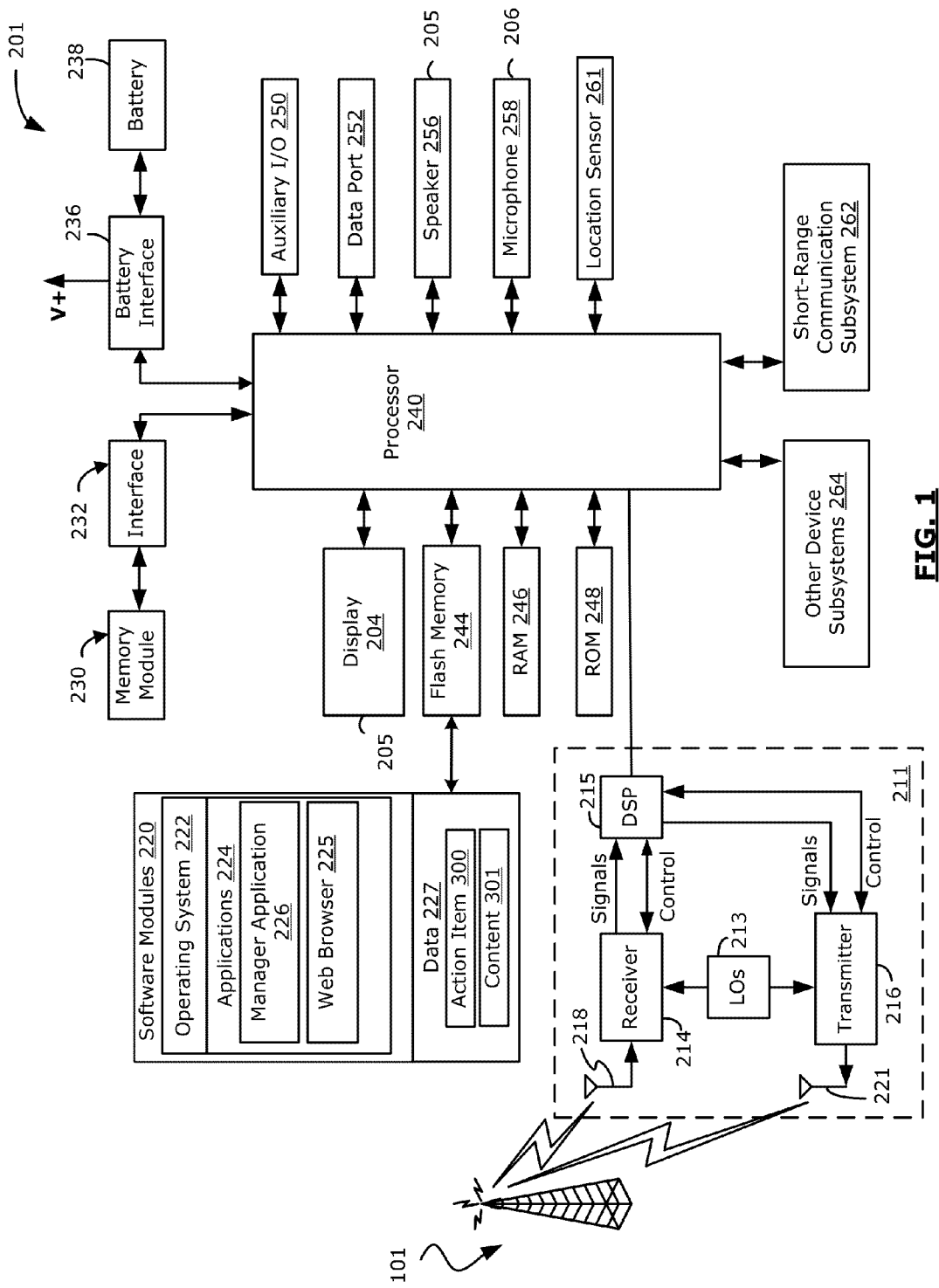
FIG. 1 is a block diagram illustrating an example electronic device in accordance with example embodiments of the present disclosure.

In one example embodiment, the present application describes a method performed by a processor on an electronic device. The method includes: receiving a request for creation of an action item, the action item comprising a record of a proposed future action; obtaining context information associated with the action item, the context information specifying two or more reminder conditions associated with the action item; and triggering a reminder of the action item based on the two or more reminder conditions.

In another example embodiment, the present application describes an electronic device. The electronic device includes a processor and a display coupled with the processor. The electronic device also includes a memory coupled with the processor. The memory includes processor-executable instructions which, when executed, cause the processor to: receive a request for creation of an action item, the action item comprising a record of a proposed future action; obtain context information associated with the action item, the context information specifying two or more reminder conditions associated with the action item; and trigger a reminder of the action item based on the two or more reminder conditions.

In another example embodiment, the present application describes a computer readable storage medium comprising computer executable instructions for causing the processor to: receive a request for creation of an action item, the action item comprising a record of a proposed future action; obtain context information associated with the action item, the context information specifying two or more reminder conditions associated with the action item; and trigger a reminder of the action item based on the two or more reminder conditions.

In another example embodiment, the present application describes a processor-implemented method. The method includes: receiving a request for creation of an action item, the action item comprising a record of a proposed future action; obtaining context information associated with the action item; storing the action item and context information; and generating a sentence describing the action item based on the context information associated with the action item.

In another example embodiment, the present application describes an electronic device. The electronic device includes a processor and a display coupled with the processor. The electronic device also includes a memory coupled with the processor. The memory includes processor-executable instructions which, when executed, cause the processor to: receive a request for creation of an action item, the action item being a record of a proposed future action; obtain context information associated with the action item; storing the action item and context information; and generate a sentence describing the action item based on the context information associated with the action item.

In another example embodiment, the present application describes a computer readable storage medium comprising computer executable instructions for: receiving a request for creation of an action item, the action item comprising a record of a proposed future action; obtaining context information associated with the action item; storing the action item and context information; and generating a sentence describing the action item based on the context information associated with the action item.

In another example embodiment, the present application describes a method of creating an action item, the method comprises: receiving a request to create an action item while a content-access application is active on an electronic device; and creating an action item based on content accessed by the content-access application when the request to create an action item was received.

In another example embodiment, the present application describes a method of creating an action item, the method comprises: receiving a request to create an action item while a web browser is active and accessing a web page; and in response to receiving the request, clipping the web page; storing the clipped web page on an electronic device; and creating an action item based on the clipped web page.

In another example embodiment, the present application describes a method performed by a processor on an electronic device. The method comprises: receiving a request for creation of an action item based on content, the action item being a record of a proposed future action; and triggering a reminder of the action item when the content is accessed.

In another example embodiment, the present application describes an electronic device. The electronic device includes a processor and a display coupled with the processor. The electronic device also includes a memory coupled with the processor. The memory includes processor-executable instructions which, when executed, cause the processor to: receive a request for creation of an action item based on content, the action item being a record of a proposed future action; and trigger a reminder of the action item when the content is accessed.

Other example embodiments of the present disclosure will be apparent to those of ordinary skill in the art from a review of the following detailed description in conjunction with the drawings.

Example embodiments of the present disclosure are not limited to any particular operating system, electronic device architecture, server architecture or computer programming language.

Example Electronic Device

Reference is first made to FIG. 1 which illustrates an example electronic device 201. In the illustrated example embodiment, the electronic device 201 is a communication device, such as a mobile communication device. In at least some example embodiments, the electronic device 201 is a two-way communication device having data and voice communication capabilities, and the capability to communicate with other computer systems, for example, via the Internet. Depending on the functionality provided by the electronic device 201, in various example embodiments the electronic device 201 may be a multiple-mode communication device configured for data and voice communication, a mobile telephone such as a smart phone, a tablet computer such as a slate computer, a wearable computer such as a watch, a PDA (personal digital assistant), or a computer system.

A smartphone is a mobile phone which offers more advanced computing capabilities than a basic non-smartphone cellular phone. For example, a smartphone may have an ability to run third party applications which are stored on the smartphone.

A tablet computer (which may also be referred to as a tablet) is an electronic device 201 which is generally larger than a mobile phone (such as a smartphone) or personal digital assistant. Many mobile phones or personal digital assistants are designed to be pocket sized. That is, mobile phones or personal digital assistants are generally small enough to be carried by a person easily, often in a shirt or pant pocket while tablet computers are larger and may not fit within pant pockets. For example, many tablet computers have a height which is seven inches (7") or more. In some example embodiments, the tablet computer may be a slate computer. A slate computer is a tablet computer which does not include a dedicated keyboard. A slate computer may allow for text input through the use of a virtual keyboard or an external keyboard which connects to the slate computer via a wired or wireless connection.

In other example embodiments, the electronic device 201 may be of a type not specifically listed above.

The electronic device 201 includes a housing (not shown) which houses components of the electronic device 201. The internal components of the electronic device 201 are constructed on a printed circuit board (PCB). The electronic device 201 includes a controller including at least one processor 240 (such as a microprocessor) which controls the overall operation of the electronic device 201. The processor 240 interacts with device subsystems such as a wireless communication subsystem 211 for exchanging radio frequency signals with a wireless network 101 to perform communication functions. The processor 240 interacts with additional device subsystems including one or more input interfaces 206 (such as a keyboard, one or more control buttons, one or more microphones 258, and/or a touch-sensitive overlay associated with a touchscreen display), flash memory 244, random access memory (RAM) 246, read only memory (ROM) 248, auxiliary input/output (I/O) subsystems 250, a data port 252 (which may be a serial data port, such as a Universal Serial Bus (USB) data port), one or more output interfaces 205 (such as a display 204, one or more speakers 256, or other output interfaces), a location sensor 261, a short-range communication subsystem 262, and other device subsystems generally designated as 264. Some of the subsystems shown in FIG. 1 perform communication-related functions, whereas other subsystems may provide "resident" or on-device functions.

The electronic device 201 may include a touch-sensitive display 204 which may be referred to as a touchscreen or a touchscreen display 204. The touchscreen display 204 may be constructed using a touch-sensitive input surface connected to an electronic controller. The touch-sensitive input surface overlays the touchscreen display 204 and may be referred to as a touch-sensitive overlay. The touch-sensitive overlay and the electronic controller provide a touch-sensitive input interface 206 and the processor 240 interacts with the touch-sensitive overlay via the electronic controller. That is, the touchscreen display 204 acts as both an input interface 206 and an output interface 205.

The communication subsystem 211 includes a receiver 214, a transmitter 216, and associated components, such as one or more antenna elements 218 and 221, local oscillators (LOs) 213, and a processing module such as a digital signal processor (DSP) 215. The antenna elements 218 and 221 may be embedded or internal to the electronic device 201 and a single antenna may be shared by both receiver 214 and transmitter 216. The particular design of the wireless communication subsystem 211 depends on the wireless network 101 in which the electronic device 201 is intended to operate.

The electronic device 201 may communicate with any one of a plurality of fixed transceiver base stations of the wireless network 101 within its geographic coverage area. The electronic device 201 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 215. In a similar manner, signals to be transmitted are processed, including modulation and encoding, for example, by the DSP 215. These DSP-processed signals are input to the transmitter 216 for digital-to-analog (D/A) conversion, frequency up conversion, filtering, amplification, and transmission to the wireless network 101 via the antenna 221. The DSP 215 not only processes communication signals, but may also provide for receiver and transmitter control. For example, the gains applied to communication signals in the receiver 214 and the transmitter 216 may be adaptively controlled through automatic gain control algorithms implemented in the DSP 215.

In some example embodiments, the auxiliary input/output (I/O) subsystems 250 may include an external communication link or interface, for example, an Ethernet connection. The electronic device 201 may include other wireless communication interfaces for communicating with other types of wireless networks, for example, a wireless network such as an orthogonal frequency division multiplexed (OFDM) network. The auxiliary I/O subsystems 250 may include a pointing or navigational tool (input device) such as a clickable trackball or scroll wheel or thumbwheel, or a vibrator for providing vibratory notifications in response to various events on the electronic device 201 such as receipt of an electronic message or incoming phone call, or for other purposes such as haptic feedback (touch feedback).

In some example embodiments, the electronic device 201 also includes a removable memory module 230 (typically including flash memory) and a memory module interface 232. Network access may be associated with a subscriber or user of the electronic device 201 via the memory module 230, which may be a Subscriber Identity Module (SIM) card for use in a GSM network or other type of memory module for use in the relevant wireless network. The memory module 230 may be inserted in or connected to the memory module interface 232 of the electronic device 201.

The electronic device 201 may store data 227 in an erasable persistent memory, which in one example embodiment is the flash memory 244. In various example embodiments, the data 227 may include service data having information required by the electronic device 201 to establish and maintain communication with the wireless network 101. The data 227 may also include user application data such as email messages, address book and contact information, calendar and schedule information, notepad documents, image files, and other commonly stored user information stored on the electronic device 201 by its user, and other data. The data 227 stored in the persistent memory (e.g. flash memory 244) of the electronic device 201 may be organized, at least partially, into a number of databases or data stores each containing data items of the same data type or associated with the same application. For example, email messages, contact records, and task items may be stored in individual databases within the memory of the electronic device 201.

The data 227 may include content 301. Content 301 which is stored locally in memory of the electronic device 201 may be referred to as stored content. Such stored content may, for example, include any one or combination of the following: a video (such as, for example, an MPEG video, WMV video, AVI video, etc.), an audio file (such as, for example, an MP3 audio file, a WAV audio file, a RealAudio audio file, etc.), a word processor file (such as a Microsoft Word™ file, etc.), a spreadsheet (such as a Microsoft Excel™ file), an electronic book (such as an e-book in an EPUB, MOBI, or other file format), a presentation (such as a Microsoft PowerPoint™ presentation), a Portable Document Format (PDF) document, an image file (such as a raster, vector or 3D graphic image including, for example, a JPEG file, TIFF file, etc.). Other types of content apart from those types listed above may also be stored in memory of the electronic device 201.

The data 227 may include one or more action items 300. As will be described in greater detail below, an action item 300 may be a record of an action that a user wishes to be reminded of. That is, the action item 300 may be a record of a future action (i.e. an action that a user intends to perform in the future). More particularly, the action item 300 serves as a record for a user to remind the user that an action is required.

In at least some embodiments, the action item may include context information. Context information may be information which is associated with the action item 300. More particularly, the context information may provide context for the action item 300. The context information may explain the circumstances which caused the creation of the action item and/or a requirement associated with the completion of the action item.

In at least some embodiments, the context information may provide answers to one or more of the five Ws—"when", "who", "why", "where" and "what." For example, the context information may include a plurality of context items, each providing an answer to a different one of the five Ws. For example, the context information may include a "why" context item which specifies a reason why the action item was created. Similarly, the context information may include a "who" context item which specifies one or more persons associated with the action item. The person may be someone whose presence will be necessary or desirable for completion of the action item. For example, completion of the action item may require discussions with the person specified in the "who" context item.

Similarly, a "when" context item may specify timing information associated with the action item. For example, the "when" context item may specify a date or time period during which the action item is to be completed. In some embodiments, the timing information may specify a date (or period of time) when the action item is to be completed or when a reminder should be generated based on the action item. The timing information may, however, be specified in a less-precise manner; for example, the timing information may be specified using imprecise terms such as "soon" or "someday". In at least some embodiments, software may associate each of these imprecise terms with a defined time period for the purposes of generating reminders. For example, "soon" may generate a reminder a week after creation of the action item while "someday" may generate a reminder a month after creation of the action item.

In at least some embodiments, a "why" context item may specify a reason why the action item was created. The "why" context item may be generated based on freeform input of a user in a text box. For example, a user may be prompted to input information as to the reason for creating the action item. By way of example, a user may input a short response such as "it is interesting", "need to review", etc., which describes their reason for creating the action item.

A "where" context item may be associated with the action item and may be used to specify a location associated with the action item. The location may, for example, be a location where the action item is to be completed or where the action item may be completed or may be a location where the user wishes to be reminded of the action item. That is, the "where" context item may specify a location related to the action item (such as a location at which the action item will become relevant).

A "what" context item may be associated with the action item and may be used to identify content 301 associated with the action item. The content 301 may be content which a user requires to complete the action. For example, the content 301 may be content which the user wishes to view, read or listen to. The content 301 may be any of the content described above, or other content. By way of example, the content 301 may be a video, audio file, word processing document, etc. In some embodiments, the content may be a web-page, which may be clipped using a web-clipper and stored locally in memory of the electronic device 201.

As will be described in greater detail below, these context items may act as reminder conditions for the action item 300. That is, reminders may be generated based on the context items.

The action item 300 may not include the content 301 itself. Rather, the action item may include a link or reference to the content 301. This link or reference allows the content to be accessed when accessing the action item 301.

The data port 252 may be used for synchronization with a user's host computer system (not shown). The data port 252 enables a user to set preferences through an external device or software application and extends the capabilities of the electronic device 201 by providing for information or software downloads to the electronic device 201 other than through the wireless network 101. The alternate download path may, for example, be used to load an encryption key onto the electronic device 201 through a direct, reliable and trusted connection to thereby provide secure device communication.

In some example embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable Bluetooth® connection to the host computer system for processing.

The electronic device 201 also includes a battery 238 as a power source, which is typically one or more rechargeable batteries that may be charged, for example, through charging circuitry coupled to a battery interface 236 such as the serial data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The short-range communication subsystem 262 is an additional optional component which provides for communication between the electronic device 201 and different systems or devices, which need not necessarily be similar devices. For example, the short-range communication subsystem 262 may include an infrared device and associated circuits and components, or a wireless bus protocol compliant communication mechanism such as a Bluetooth® communication module to provide for communication with similarly-enabled systems and devices.

The location sensor 261 is configured to determine a geographic location of the electronic device 201. That is, the location sensor 261 may be configured to act as a positioning system to determine the location of the electronic device 201 in space. In some embodiments, the location sensor 261 may be a global positioning system (GPS) sensor which is configured to determine a location using satellites. The location sensor 261 may take other forms in other embodiments. For example, the location sensor 261 may determine location through triangulation by measuring the strength and direction of signals from two or more nearby cell phone towers.

A pre-determined set of applications that control basic device operations, including data and possibly voice communication applications will normally be installed on the electronic device 201 during or after manufacture. Additional applications and/or upgrades to an operating system 222 or software applications 224 may also be loaded onto the electronic device 201 through the wireless network 101, the auxiliary I/O subsystem 250, the data port 252, the short-range communication subsystem 262, or other suitable device subsystems 264. The downloaded programs or code modules may be permanently installed, for example, written into the program memory (i.e. the flash memory 244), or written into and executed from the RAM 246 for execution by the processor 240 at runtime.

In some example embodiments, the electronic device 201 may provide two principal modes of communication: a data communication mode and a voice communication mode. In the data communication mode, a received data signal such as a text message, an email message, or a web page download will be processed by the communication subsystem 211 and input to the processor 240 for further processing. For example, a downloaded web page may be further processed by a browser application or an email message may be processed by the email messaging application and output to the touchscreen display 204. A user of the electronic device 201 may also compose data items, such as email messages, for example, using the input devices, such as the touchscreen display 204. These composed items may be transmitted through the communication subsystem 211 over the wireless network 101.

In the voice communication mode, the electronic device 201 provides telephony functions and operates as a typical cellular phone. The overall operation is similar to the data communication mode, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input devices). Alternative voice or audio I/O subsystems, such as a voice message recording subsystem, may also be implemented on the electronic device 201. Although voice or audio signal output is typically accomplished primarily through the speaker 256, the touchscreen display 204 may also be used to provide an indication of the identity of a calling party, duration of a voice call, or other voice call related information.

The processor 240 operates under stored program control and executes software modules 220 stored in memory such as persistent memory, for example, in the flash memory 244. As illustrated in FIG. 1, the software modules 220 include operating system software 222 and software applications 224, such as a manager application 226 and/or a web browser application 225.

As will be described in greater detail below, in at least some embodiments, the manager application 226 is configured to create and manage action items 300. For example, the manager application 226 may be configured to generate context information and/or to prompt users to input context information associated with an action item 300. Methods of creating and/or using action items will be described in greater detail below with reference to FIGS. 2 to 14.

In at least some embodiments, the manager application 226 is configured to trigger reminders (e.g. to generate an audible, visual or vibratory alert) based on such context information.

Accordingly, the context information of an action item 300 may specify reminder conditions associated with that action item 300. The reminder conditions may specify conditions which cause a reminder of the action item 300 to be triggered. In at least some embodiments, some or all these reminder conditions may be based on one or more of the context items referred to above. For example, any of the "what" context item, the "when" context item, the "where" context item, or the "who" context item, may act as a basis for a reminder condition. For example, the "what" context item may be used generate a reminder when content 301 associated with an action item 300 is being accessed and/or consumed. For example, if an action item 300 is created based on content 301, such as a video, if the same content 301 is accessed sometime later, the reminder may be triggered.

Similarly, timing information specified by a "when" context item of an action item 300 may be used to generate a reminder. For example, timing information specified by a "when" context item may specify a deadline for an associated action item 300 and a reminder may be triggered based on the deadline; for example, when the deadline has expired and/or when the deadline is imminent.

Similarly, a location specified by a "where" context item of an action item 300 may be used to generate a reminder. For example, when a user is currently in a location specified by a "where" context item, a reminder may be triggered. Similarly, in some embodiments, if the electronic device 201 determines that a user has planned to be in the location specified in a "where" context item, a reminder may be triggered.

Similarly, a person or persons specified by a "who" context item of an action item 300 may be used to generate a reminder. In at least some embodiments, the electronic device 201 may attempt to identify possible interactions with the person or persons specified in a "who" context item and may trigger a reminder when a possible interaction is identified. Specific methods of identifying possible interactions will be discussed below.

Accordingly, in at least some embodiments, a single action item 300 may have two or more reminder conditions associated therewith. For example, two or more of the context items referred to above (i.e. "where", "who", "what", "when") may be treated as reminder conditions. In some embodiments, the manager application 226 may be configured to trigger a reminder when a plurality of conditions associated with reminder conditions are found to exist (i.e. some reminder conditions, taken alone, may not trigger a reminder; the reminder may only be triggered when that condition and another reminder condition are found to exist). For example, in at least some embodiments, the reminder conditions specified in the "who" and "where" context items may need to exist together before a reminder will be triggered (for example, the reminder may be triggered if the location of the electronic device 201 corresponds to that specified in the "where" context item and an interaction with the person specified in the "who" context item is identified).

In other embodiments in which a single action item 300 may be associated with multiple reminder conditions, the manager application 226 may be configured to trigger the reminder when a single one of those conditions is determined to exist.

Methods of generating reminders will be described in greater detail below with reference to FIG. 11.

In some embodiments, the manager application 226 may be configured to automatically generate a summary of an action item 300 based on the context information for that action item 300. For example, in at least some embodiments, the manager application 226 may be configured to automatically generate a sentence summarizing the action item 300 based on the context information. This sentence may be displayed when displaying the action item and/or when displaying a reminder based on the action item 300.

Methods of generating such summaries will be described in greater detail below with reference to FIGS. 12 to 14.

In at least some embodiments, the manager application 226 or another application may include a sharing framework which allows action items 300 to be created from within other applications. The sharing framework may, for example, include an application programming interface (API) which allows other applications to access features or functions of the manager application 226. By way of example, the sharing framework may allow a user of another application 224, such as the web browser 225, to create an action item 300 based on content 301 associated with the other application. For example, a user of the web browser 225 may activate the sharing framework to create an action item 300 based on a web page displayed within the web browser 225. In response, the sharing framework of the manager application 226 may clip the web page and may store a representation of the web page locally on the electronic device 201 and may create an action item 300 based on the web page.

Specific functions and features of the manager application 226 will be discussed in greater detail below with reference to FIGS. 2 to 14.

In at least some example embodiments, the operating system 222 may perform some or all of the functions of the manager application 226. In other example embodiments, the functions or a portion of the functions of the manager application 226 may be performed by one or more other applications. Further, while the manager application 226 has been illustrated as a single block, the manager application 226 may include a plurality of software modules. In at least some example embodiments, these software modules may be divided among multiple applications.

The electronic device 201 may include a range of additional software applications 224, including for example, a notepad application, a word processing application, an image viewing and/or editing application, a calendar application, an address book application, a mapping application, or a media player application (such as a video player and/or an audio player), or any combination thereof. Each of the software applications 224 may include layout information defining the placement of particular fields and graphic elements (e.g. text fields, input fields, icons, etc.) in the user interface (i.e. the touchscreen display 204) according to the application. In at least some example embodiments, the software applications 224 may include pre-determined gesture information defining functionalities associated with the pre-determined gestures received via the touchscreen display 204. For example, a software application 224 may determine a finger swiping movement (i.e. a pre-determined gesture) on the touchscreen display 204 as a scrolling function.

The software modules 220 or parts thereof may be temporarily loaded into volatile memory such as the RAM 246. The RAM 246 is used for storing runtime data variables and other types of data or information. Although specific functions are described for various types of memory, this is merely one example, and a different assignment of functions to types of memory could also be used.

Creating Action Items

The following discussion will refer to example methods for creating action items 300. Reference will be made to various example display screens to facilitate understanding of the example methods. The methods may, in at least some embodiments, be performed by the manager application 226. More particularly, the manager application 226 (and/or another application 224) may contain computer-readable instructions which, when executed, cause the processor 240 of the electronic device 201 to perform the methods described below. The computer-readable instructions may be configured to cause the processor to generate one or more screens having the features described below.

Figure 2:
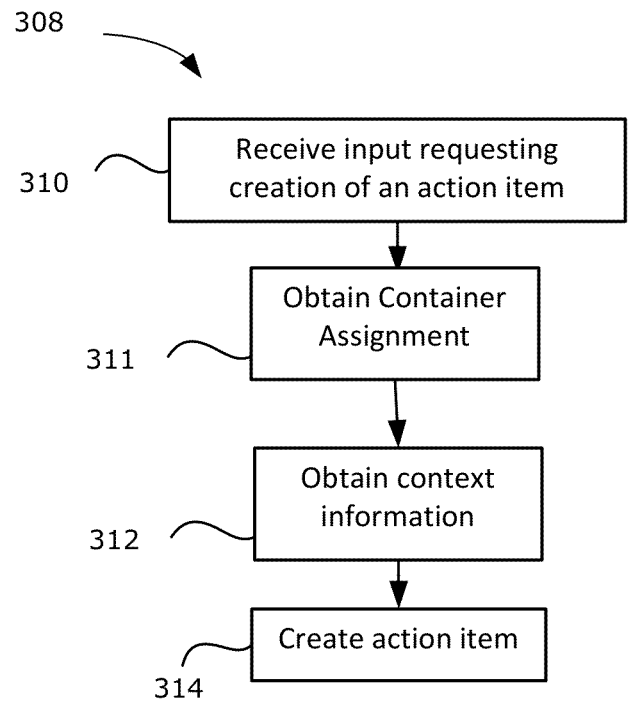
FIG. 2 illustrates a flowchart of an example method for creating an action item in accordance with example embodiments of the present disclosure.

Referring now to FIG. 2, an example method 308 for creating an action item 300 is illustrated. The features of the method 308 will be discussed with reference to the example screens of FIGS. 3 to 6.

At 310, input requesting creation of an action item 300 may be received at the electronic device 201. The input may, for example, be received via an input interface 206 (FIG. 1) associated with the electronic device 201, such as a touchscreen display 204.

In some embodiments, the input may be received from within an application which is not the manager application 226. That is, another application 224 may currently be operating and a user interface screen associated with that application may be displayed on the display 204 of the electronic device 201 when the request to create the action item 300 is received. For example, a user may input a request to create an action item 300 within another application by performing a predetermined gesture within that application. In at least some embodiments, the input may be received from within a content-access application. The content-access application may be any application for accessing content (such as the content 301 described above with reference to FIG. 1). By way of example, in various embodiments, the content-access application may be any one of: a notepad application, a word processing application, an image viewing and/or editing application, a calendar application, an address book application, a mapping application, or a media player application (such as a video player and/or an audio player). When a request to create an action item is received within a content-access application, it may be interpreted as a request to create an action item 300 based on specific content 301 (such as content which is currently displayed by the content-access application and/or content which is stored locally on the electronic device 201).

Figure 3:
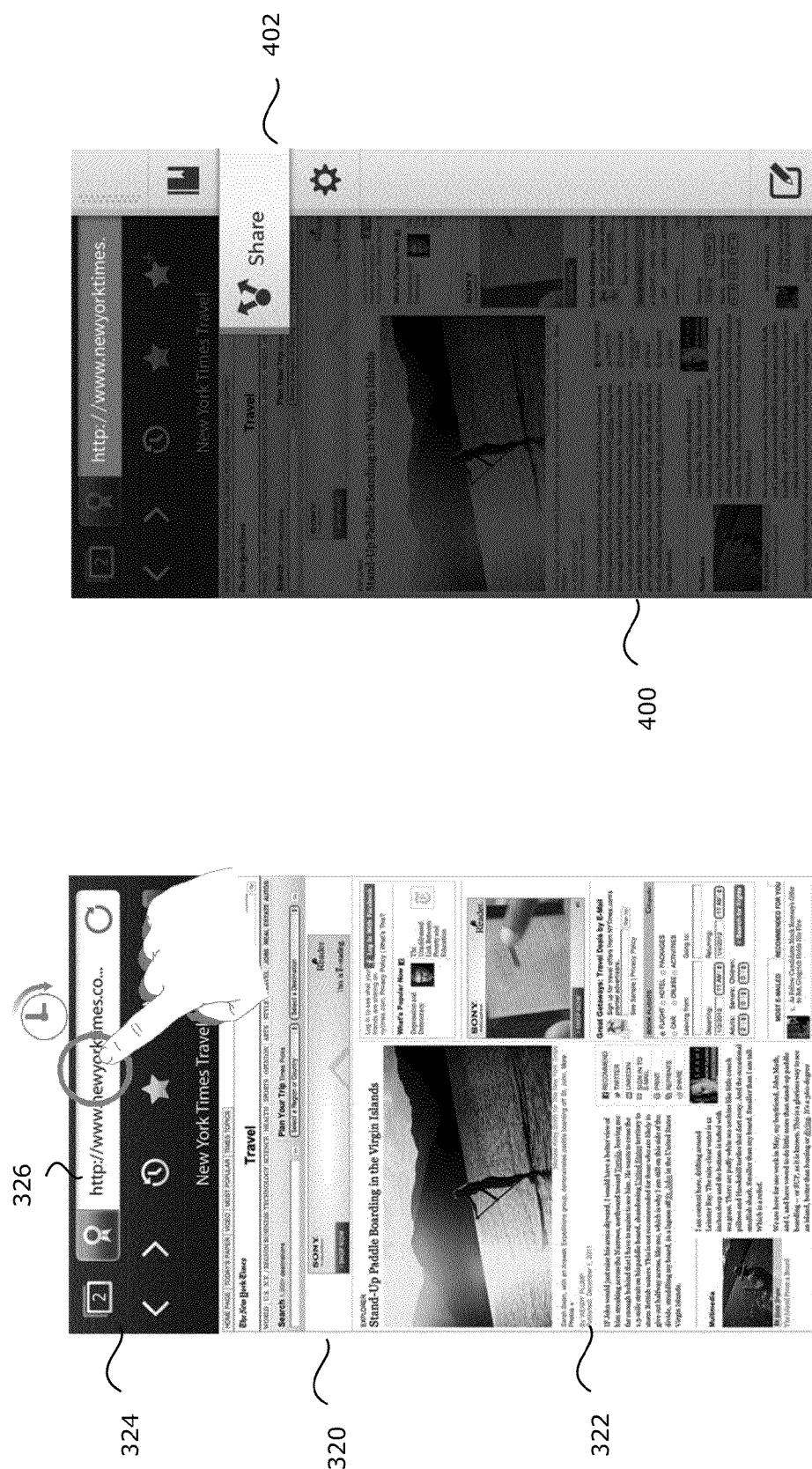
FIG. 3 is an example display screen in accordance with example embodiments of the present disclosure.

In some example embodiments, the input requesting creation of an action item 300 may be received from within a web browser 225 (FIG. 1). Referring now to FIG. 3, one such example embodiment is illustrated. FIG. 3 illustrates an example web browser screen 320 which may be displayed on the display 204 of the electronic device 201. The web browser screen 320 includes a web page display pane 322 and controls 324 for controlling the web browser 225. The controls 324 include an address bar 326 which allows for the input and display of an address associated with a web page which may be displayed within the web page display pane 322.

The web browser 225 (or other content-access application) is configured to permit a request to create an action item 300 to be received. In the example embodiment illustrated, the web browser 225 is configured to utilize the address bar 326 for this purpose. A touch or tap gesture at the address bar 326 may be interpreted, by the web browser 225, as a request to create an action item 300 based on a displayed web page if the touch or tap gesture persists for a period which exceeds a predetermined threshold (if a touch or tap is received which does not persist for the period which exceeds the predetermined threshold, then it may be interpreted as another command, such as a command to select or edit the contents of the address bar 326).

Figure 4:
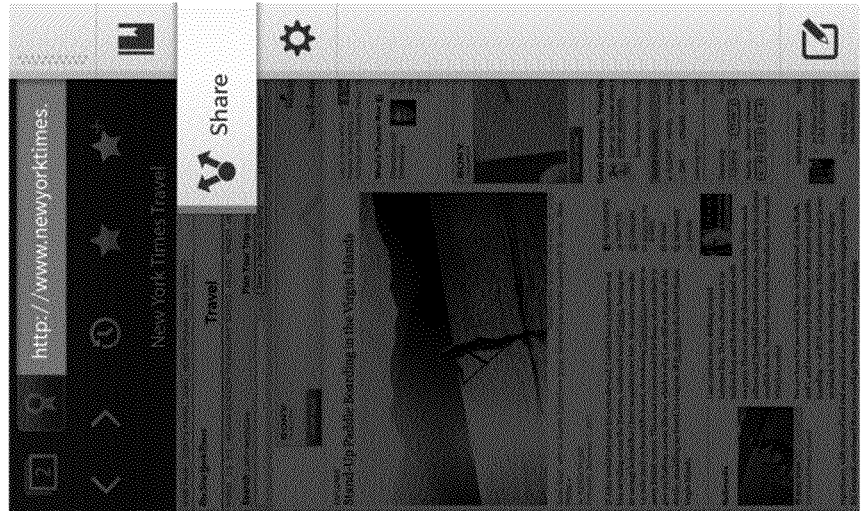
FIG. 4 is an example display screen in accordance with example embodiments of the present disclosure.

In some embodiments, the input received within the content-access application may not, directly, cause the creation of an action item 300. Instead, further input may be received. For example, in some embodiments, the input received from within the content-access application, such as the gesture received within the web browser 225 described with reference to FIG. 3, may cause a further screen 400 to be displayed on the display 204. Referring now to FIG. 4, the further screen 400 may include a selectable option 402 to engage a sharing framework associated with the electronic device 201 and/or the manager application 226. In the example illustrated, the selectable option 402 to engage the sharing framework is a selectable command button labeled "share."

The sharing framework, in at least some embodiments, may allow content to be shared in a number of different ways. That is, the sharing framework may allow a number of different sharing services to be accessed to share the content. For example, the sharing framework may, in at least some embodiments, be configured to allow content to be shared with others via electronic mail (e.g. send an email with the content or a link to the content). The sharing framework may also allow content to be shared with the manager application 226. Other methods of sharing may also be provided by the sharing framework.

Accordingly, when the sharing framework is engaged (e.g. when a user selects the selectable option 402 to share content 301 which is currently displayed or otherwise accessed by the content-access application), a further display screen 500 (illustrated in FIG. 5) may be displayed which includes a selectable option 502 to select a sharing service to be used. In the example illustrated, this selectable option 502 takes the form of a drop-down box which lists the sharing services which are available. One of the sharing services which is available is an option 504 to share the content with the manager application 226 (in the example illustrated, the manager application 226 is referred to as FocalPoint™). In this example, the option 504 to share the content with the manager application 226 acts as a request to create an action item 300. That is, when a user selects the option 504 to share the content with the manager application 226, the sharing framework may interpret this as a request to create an action item 300 based on the content. Thus, 310 of the method 308 may be performed when a user selects the option 504 to share the content with the manager application 226.

Figures 5, 6:
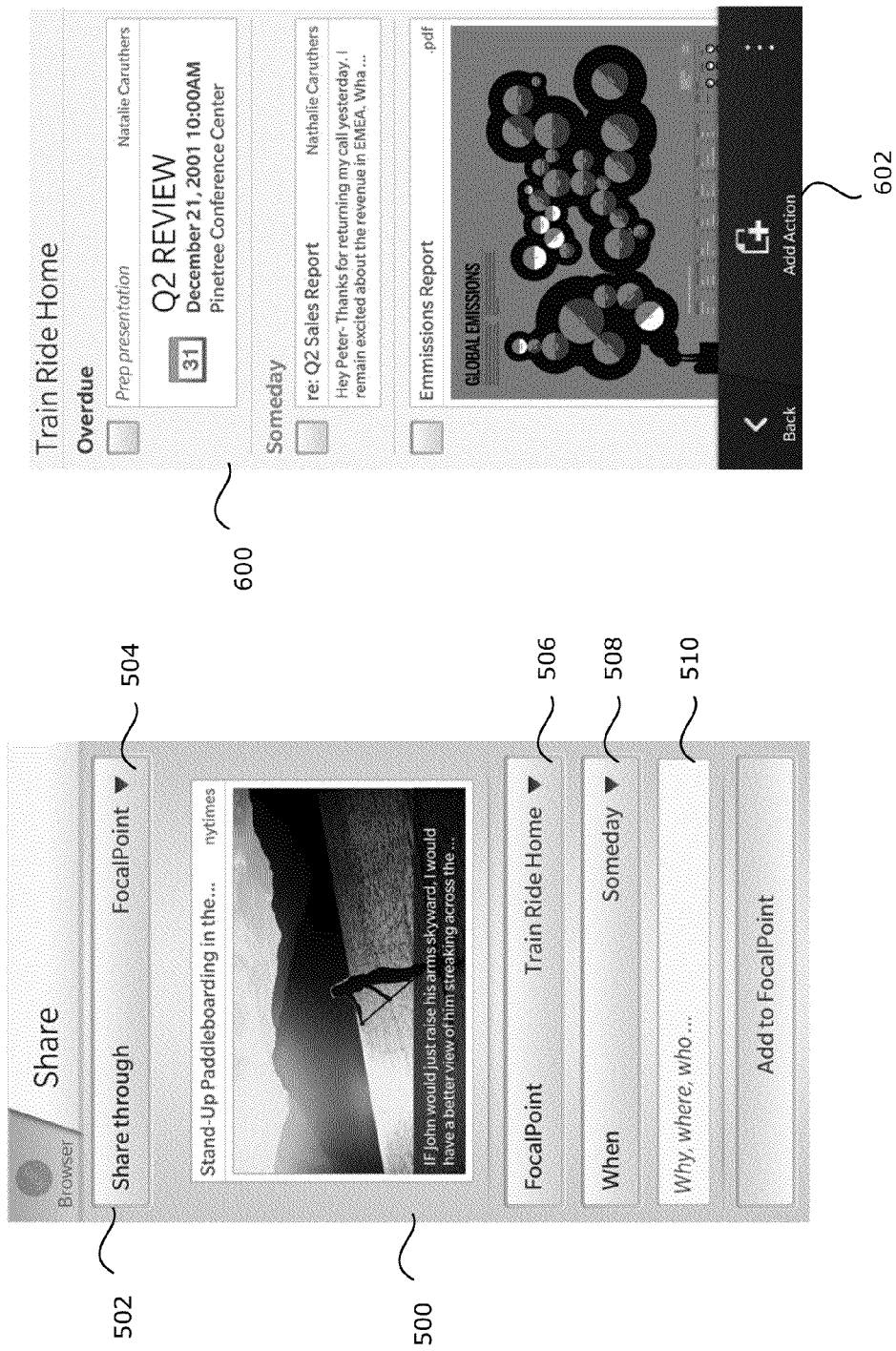
FIG. 5 is an example display screen in accordance with example embodiments of the present disclosure.
FIG. 6 is an example display screen in accordance with example embodiments of the present disclosure.

It will be appreciated that the request to create an action item may be received in other ways apart from those described above with reference to FIGS. 3 to 5. For example, in some embodiments, the request may be received directly through the manager application 226 (e.g. instead of through another application, such as a content-access application). One such example is illustrated in FIG. 6. The manager application 226 may, for example, be launched and a display screen 600 associated with the manager application 226 displayed on the display 204. The display screen 600 may include a selectable option 602 for inputting a request to create an action item 300. In the example illustrated, the selectable option 602 takes the form of an interface element labeled "Add Action".

Referring again to FIG. 2, after the input requesting creation of an action item is received, in some embodiments, at 311, the manager application 226 may obtain a container assignment for the action item 300.

A container (which may also be referred to as a bucket or FocalPoint) is an organizational construct which may be used to group related action items 300. Containers may be user-defined. That is, a user may determine a name for a container and may select the action items 300 to be assigned to a container. Each container may be used to link action items 300 so that a user may easily view related action items together. The containers 300 may define a context where the user expects to perform the action item 300.

A container may, for example, be used to group items which will become relevant to a user at the same time. For example, one container (an "emails to follow up" container) may be used to group action items 300 created based on email messages that require follow up. That is, the "emails to follow up" container tracks email messages that a user would like to follow up on (e.g. by responding to the emails). This way, when the user has time to attend to such emails, they can easily access all emails which require follow up, thereby realizing an efficiency.

Similarly, a "grocery list" container may be used to group action items 300 which relate to groceries that a user wishes to purchase. The "grocery list" container may, for example, store recipes which the user wishes to use. By storing such action items within a "grocery list" container, the user may access all action items 300 (such as the recipes) in the container when they are at a grocery store.

Similarly, a "ride home" container may be used to group action items 300 which a user wishes to address when they are commuting.

It will be appreciated that the list of containers described herein is not intended to be exhaustive and that other containers may be used instead of or in addition to the containers described herein.

In at least some embodiments, after input requesting creation of the action item 300 is received (at 310), a user interface may be provided on the electronic device 201 which is configured to allow a user to assign the action item 300 to a container. For example, referring again to FIG. 5, an example of one such user interface is illustrated. The display screen 500 of FIG. 5 includes a selectable option 506 to assign the action item 300 to a container. The selectable option 506 may, in at least some embodiments, be configured to allow for selection of an existing container. The selectable option 506 may also allow a user to define a new container.

Referring again to FIG. 2, after the input requesting creation of an action item is received, the manager application 226 may, at 312, obtain context information associated with the action item 300.

Context information may be information which is associated with the action item 300 and which lends context to the action item 300. The context information may include information regarding circumstances which caused the creation of the action item and/or requirement(s) associated with the completion of the action item. The context information may include one or more context items. Context items may provide different types of context information (i.e. information of different context types). In some embodiments, each context item may define context information of a separate context type. By way of example, in at least some embodiments, the context information may provide answers to one or more of the five Ws—"when", "who", "why", "where" and "what." A "why" context item may specify a reason why the action item is to be, or has been, created, a "who" action item may specify one or more persons associated with the action item, a "when" context item may specify timing information associated with the action item, a "where" context item may specify one or more locations associated with the action item, and a "what" context item may identify content 301 associated with the action item. These context items are explained in greater detail above in the discussion of FIG. 1.

In at least some embodiments, after input requesting creation of the action item 300 is received (at 310), a user interface may be provided on the electronic device 201 which may allow a user to input such context information. For example, referring again to FIG. 5, an example of a display screen 500 which allows for input of context information is illustrated. The display screen 500 includes interface elements 508, 510 for receiving input specifying context information. The interface elements 508, 510 may act as prompts, prompting a user to input specific types of context information.

In the embodiment of FIG. 5, an interface element 508 allows a user to input timing information associated with a "when" context item. The interface element 508 may prompt a user to input such timing information. For example, in the embodiment illustrated, the interface element 508 includes a label "When" to indicate to user that the interface element may be used for inputting timing information associated with the action item.

As noted previously, in some cases the timing information may identify a deadline for the action item 300. In the example illustrated, a drop down box is used to allow a user to input such timing information. In the embodiment illustrated, the interface element 508 allows a user to input imprecise timing information associated with the context item. Such imprecise timing information may specify an imprecise time period for completing the action item. For example, the interface element 508 may allow a user to select any one or combination of the following: "soon", "someday", "far off", "ASAP," "yesterday", "now". In at least some embodiments, such imprecise terms may be associated with more precise time periods in memory for the purposes of generating reminders. That is, imprecise timing information may be mapped to more precise timing information. By way of example, "soon" may be mapped to a time period of one week so that, after a week has elapsed, a reminder is generated based on the action item 300.

In some embodiments, more precise timing information may be input by a user. For example, in some embodiments, the interface element 508 may allow a user to specify a precise time period (such as, for example, "one day", "two days", "one week", "one month", etc.). In some embodiments, the interface element 508 may allow a user to specify a calendar date which may be specified in terms of a day, month and/or year.

In at least some embodiments, the "when" context item is a required context item. That is, in at least some embodiments, the "when" context information may be required to be populated. In at least some embodiments, when no input is received to specify timing information for the "when" context item, then the "when" context item may be populated with default timing information. By way of example, in some embodiments, the default timing information may specify that the action item is to be completed "someday."

The example display screen 500 shown in FIG. 5 also includes an interface element 510 for receiving input specifying other context information. For example, the display screen 500 may allow a user to input information associated with a "why" context item, a "where" context item and/or a "who" context item.

In at least some embodiments, a prompt may be displayed requesting a user to input specific types of context information. For example, the display screen 500 may prompt a user to input a reason why an action item is was created (i.e. to input information for the "why" context item). In response to the prompt, a user may specify context information indicating a reason why the action item is was created. In at least some embodiments, a freeform text field may be provided for a user to input the information for the "why" context item. The freeform text field may allow a user a large amount of flexibility when specifying the reason; for example, a user may specify any reason which the user wishes to specify, subject to possible character-length constraints and/or character-type constraints associated with the freeform text field.

In at least some embodiments, a display screen may prompt a user to input context information specifying one or more persons associated with the action item (i.e. to input information for the "who" context item). In response to the prompt, a user may specify context information indicating the person(s) associated with the action item. These persons may, for example, be persons whose presence is required to complete the action item. In at least some embodiments, the manager application 226 may connect to an address book application associated with the electronic device 201 and/or associated with the user to allow a user to select a person having a contact record in an existing address book accessible to the electronic device 201. That is, the user interface provided by the manager application 226 may allow a user to rely on existing contact records when specifying one or more persons associated with the action item 300. For example, a list of contact records may be displayed and a user may be permitted to select from the list.

In at least some embodiments, a display screen may prompt a user to input context information specifying one or more locations associated with the action item (i.e. to input information for the "where" context item). In response to the prompt, a user may specify context information indicating a location associated with the action item. For example, the location may be a location where the user intends to complete the action item. The location may be specified in terms of a geographic location (e.g. a city, street address, country, etc.) or may be specified in more imprecise terms (e.g. by specifying that the location is "home" or "work") Imprecise locations, such as home and work, may be associated with more precise locations in memory. For example, the memory may store a home address and/or a work address so that when a user selects "home" or "work", the manager application 226 is able to determine a more precise location to be associated with the action item for the purpose of generating reminders.

In the embodiment illustrated in FIG. 5, the display screen 500 includes a single interface element 510 which is used for inputting context information for the "who" context item, the "where" context item and the "why" context item. Activation of this interface element 510 may cause further display screen to be displayed which may contain further interface elements for inputting context information. For example, in some embodiments, activation of the interface element 510 may cause a further screen to be displayed which includes separate interface elements for inputting context information for each of the "why", "where", and "who" context items. The use of a shared interface element on the display screen 510 may be useful due to screen size constraints of the display 204.

Other context information may be obtained instead of or in addition to the context information discussed above (i.e. the "who", "where", "when" and "why" context items). For example, in some embodiments, a "what" context item may be obtained. The "what" context item may define an object which is associated with the action item 300. The object may be a material or virtual thing that can be seen or touched. By way of example, the "what" context may be used to identify content 301 associated with the action item 300. The content 301 may be content which a user requires to complete the action. For example, the content 301 may be content which the user wishes to view, read or listen to. By way of example, the content 301 may be a video, audio file, word processing document, etc. In some embodiments, the content may be a web-page, which may be clipped using a web-clipper and stored, for example, locally in memory of the electronic device 201.

In at least some embodiments, the "what" context item may be populated with a link to the content associated with the action item 300 and/or a brief description of the content. The link or brief description may, in at least some embodiments, be automatically generated. For example, when the input requesting creation of an action item 300 (310 of FIG. 2) is received from within a content-access application, the "what" context item may be populated based on the content which was active in the content-access application at the time of the request. For example, when a request to create the action item is received from within a web browser 225, the "what" context item may be populated based on the web page displayed on the display 204 immediately prior to the request. In at least some such embodiments, the web page may be clipped (i.e. a representation of the web page may be stored in local memory) and the action item may be associated with or may include the clipped web page.

In at least some embodiments, the action item 300 may be populated with an item of content 301 stored on the electronic device 201, such as a video, image, etc. However, in other embodiments, the actual item of content 301 may not be included in the action item 300. Instead, a link or reference to existing content 301 (i.e. content already stored in local memory) may be automatically included in the action item 300. The link or reference allows the content 301 to be accessed when the action item 300 is accessed, but reduces memory redundancies by not storing the content 301 both in the action item and elsewhere in memory.

As noted above, in at least some embodiments, some of the context information for an action item may be automatically generated. As noted above, in some embodiments, context information may be automatically generated for the "what" context item. Similarly, other types of context information may be automatically generated. For example, in some embodiments, context information for the "who" context item may be automatically generated. By way of example, when a request to create an action item is received while an electronic communication is displayed on the display, the "who" context item may be automatically populated based on a sender or recipient associated with that electronic communication. For example, if an email is displayed immediately before a request to create an action item is received, then the "who" context item may be populated with a contact who sent the email.

Referring again to FIG. 2, in at least some embodiments, after the context information is obtained (at 312), at 314 the manager application 226 may create the action item 300. The action item 300 may be created, for example, by storing the action item in memory of the electronic device 201. That is, in at least some embodiments, the action item 300, including the context information described above, may be stored in memory, such as a memory of the electronic device 201.

In at least some embodiments, after the action item 300 is created, user interface focus on the electronic device 201 may return to the application which was active on the electronic device 201 during or immediately before the request to create the action item was received. For example, the application which was displayed prior to the receipt of the request to create the action item may again be displayed. By way of further example, if receipt of the request was received while a content-access application, such as a web browser 225, was displayed (as described above with reference to FIGS. 3 and 4), then the content-access application may again be displayed after creation of the action item.

Accessing Action Items

The following discussion will refer to example methods for accessing action items 300. Reference will be made to various display screens to facilitate understanding of the example methods. The methods may, in at least some embodiments, be performed by the manager application 226. More particularly, the manager application 226 (and/or another application 224) may contain computer-readable instructions which, when executed, cause the processor 240 of the electronic device 201 to perform the methods described below. The computer-readable instructions may be configured to cause the processor to generate one or more screens having the features described below.

Figure 7:
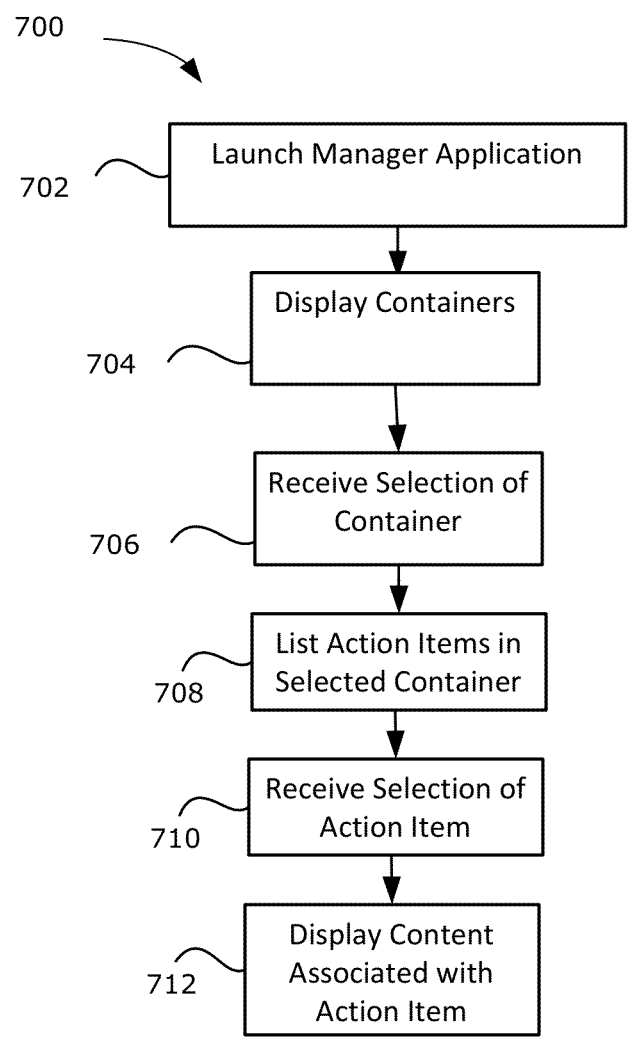
FIG. 7 is a flowchart of an example method of accessing an action item in accordance with example embodiments of the present disclosure.

Referring now to FIG. 7, an example method 700 for accessing an action item 300 is illustrated. The features of the method 700 will be discussed with reference to the example screens of FIGS. 8 to 10.

In at least some embodiments, the manager application 226 is configured so that, after an action item is created, that action item may be accessed from within the manager application 226. For example, the manager application 226 may be launched (at 702) on the electronic device 201 using any one of a number of techniques. For example, an icon associated with the manager application 226 may be selected on a user interface provided by the electronic device's operating system 222, causing the manager application 226 to be launched.

After the manager application 226 is launched, at 704, a display screen 800 may be displayed on the display 204 which lists available containers. Referring briefly to FIG. 8, an example of one such display screen 800 is illustrated. The display screen 800 lists a plurality of selectable containers 802. These containers 802 may be containers to which action items 300 were previously assigned according to the method described above with reference to 311 of FIG. 2. In some embodiments, the containers 802 may identify the number of items contained in the container and/or may indicate whether there are any overdue action items in the container. In the embodiment illustrated, the containers specify the number of overdue action items in the container.

In the embodiment illustrated, the display screen 800 also includes a selectable option 804 to display all action items 300. Selection of the selectable option 804 to display all action items 300 may cause the electronic device 201 to display a list of all action items 300, irrespective of the containers which those action items are assigned to.

Referring again to FIG. 7, after the list of available containers is displayed (at 704), at 706 the electronic device 201 may receive a selection of one of the containers. In response, at 708, the electronic device 201 may display a list of action items contained in the selected container. Referring now to FIG. 9, an example of one such list is illustrated. FIG. 9 illustrates a display screen 900 which includes a list of action items 300 contained in a selected container 802 (FIG. 8). In the example illustrated, the selected container is a "Train Ride Home" container. In the embodiment illustrated, the list includes a short description of the action item and also includes check boxes which allow a user to mark action items as completed. In at least some embodiments, when an action item is marked completed, it is moved to the bottom of the list. In other embodiments, when an action item is marked completed, it is removed from the list.

In the example illustrated, the action items 300 are ordered according to urgency. That is, they are ordered according to the deadline associated with the action item (i.e. they are ordered based on the timing information in the "when" context item). Overdue items are listed more prominently than items with a longer deadline.

The list of action items may be sorted according to other criteria in other embodiments. For example, the list may be sorted according to information contained in the "who" context item to allow a user to view action items which are grouped according to the persons associated with those action items. Similarly, the list may be sorted according to information contained in the "where" context item to allow a user to view action items which are grouped according to the location associated with those action items. Similarly, the list may be sorted according to information contained in the "what" context item to allow a user to view action items which are grouped according to the content associated with those action items.

In at least some embodiments, the sorting of the list may be user-defined. That is, a user may specify how they would like the list to be sorted.

Figure 10:
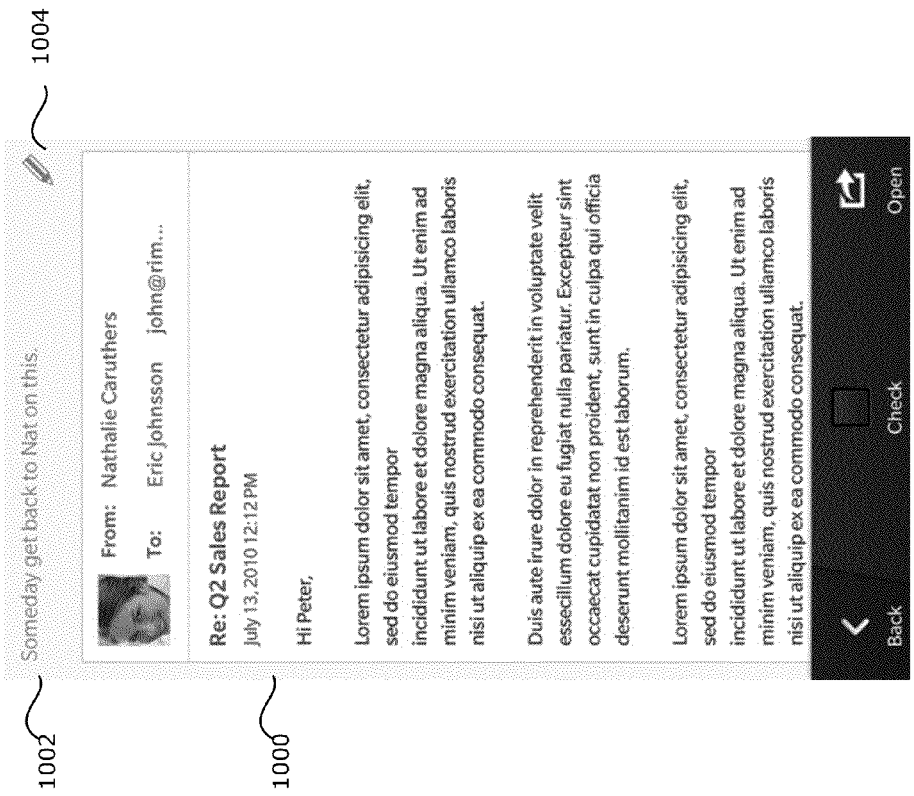
FIG. 10 is an example display screen in accordance with example embodiments of the present disclosure.

Referring again to FIG. 7, in at least some embodiments, after the list of action items is displayed (at 708), a selection of an action item may be received at 710. In response to receiving such a selection, the manager application 226 may automatically display at 712 (or otherwise output) content 301 associated with the action item 300. Referring briefly to FIG. 10, an example of a display screen 1000 which displays content associated with a selected action item is illustrated. In the example illustrated, the selected action item is associated with email content. Accordingly, the email associated with the action item is displayed on the display 204. In the example illustrated, the content associated with the action item is displayed together with a summary 1002 of the action item 300. In this example, the summary is a single sentence which is automatically generated based on the content information for the action item. Methods of generating such a summary 1002 will be described in greater detail below.

Reminders based on Action Items

In at least some embodiments, context information associated with an action item (such as the "who", "what", "where", "why" and "when" context items) may be used for the purposes of generating reminders. Such reminders may be useful, for example, to increase the likelihood that a user will perform a task associated with an action item 300 and/or to allow a user to perform the task at an opportune time.

In at least some embodiments, the manager application 226 may be configured to utilize one or more of the context items (such as the "who", "what", "where", "why" and "when" context items) as reminder conditions and to trigger a reminder based on these reminder conditions.

Figure 11:
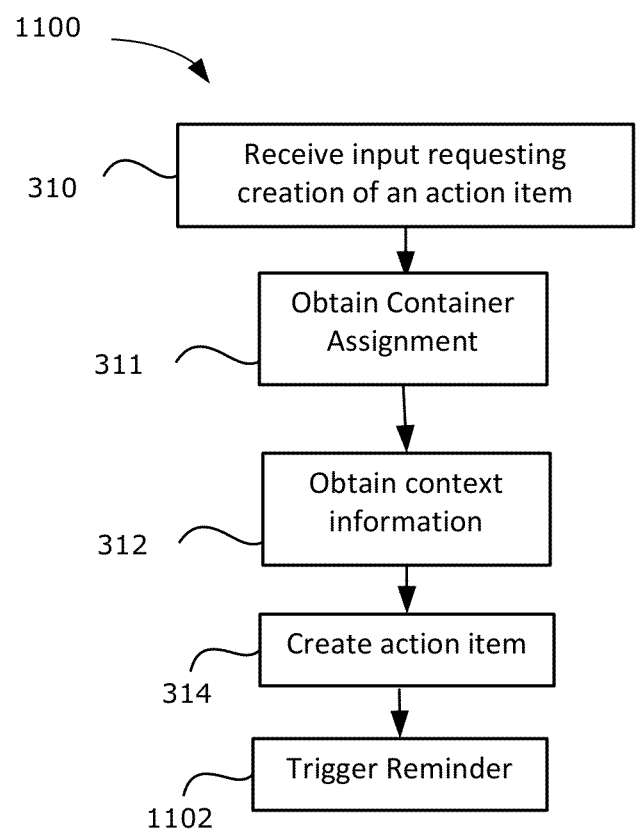
FIG. 11 is a flowchart of an example method for triggering a reminder in accordance with example embodiments of the present disclosure.

Referring now to FIG. 11, a flowchart of an example method 1100 of triggering a reminder based on such reminder conditions is illustrated. The method 1100 may, in at least some embodiments, be performed by the manager application 226. More particularly, the manager application 226 (and/or another application 224) may contain computer-readable instructions which, when executed, cause the processor 240 of the electronic device 201 to perform the method 1100 described below.

The method 1100 includes various operations and features (310, 311, 312, 314) which were described above with reference to the method 308 of FIG. 2. To avoid repetition, similar numerals have been used to indicate the same or similar features or operations of the methods 308 and 1100. Accordingly, such operations and features may operate as described above with reference to FIG. 2.

First, at 310, input is received requesting creation of an action item. Such input may be received in the manner described above with reference to FIG. 2. At 311, a container assignment for the action item is obtained. This container assignment may be obtained in the manner described above with reference to FIG. 2.

At 312, context information associated with the action item is obtained. 312 may be performed as described above with reference to FIG. 2 and, at 314, an action item may be created in the manner described above with reference to FIG. 2. At 1102, a reminder of the action item may be triggered based on the reminder conditions.

In some embodiments, the context information may specify reminder conditions for the action item. Reminder conditions are conditions which are used to trigger a reminder of the action item 300. In at least some embodiments, one or more of the reminder conditions may be context items of the type described above (i.e. "who", "what", "where", "why" and "when" context items may be treated as reminder conditions). For example, a reminder condition may be based on a "when" context item which identifies a deadline for completing the action item. In such embodiments, a reminder may be triggered based on the deadline; for example, if the deadline expires and/or if a deadline is approaching, a reminder may be triggered. For example, if the timing information specifies a time period for completing the action item, then, after the time period has elapsed, if the action item is not marked completed, a reminder may be triggered.

Similarly, in some embodiments, a reminder condition may be based on a "who" context item. The "who" context item may specify a contact (such as a person known to the user of the electronic device 201) who is to be involved in completing the action item. In such embodiments, the manager application 226 may trigger a reminder based on the "who" context item by identifying possible interactions with that contact and by triggering a reminder when actual or possible interactions with that contact are identified.

Such interactions may be identified, for example, using a location sharing service. A location sharing service is a service which shares location information specifying a contact's current or future location. By way of example, the location sharing service may be Foursquare™. In at least some such embodiments, the manager application 226 may determine whether an interaction with the contact is possible or likely based on the location of the contact provided by the location sharing service. In at least some embodiments, the manager application 226 may determine whether the contact is close to the electronic device 201. This determination may be made by comparing a location of the electronic device 201 (which may be obtained from a location sensor 261 (FIG. 1) such as a GPS sensor) with the location of the contact, as provided by the location sharing service. If the electronic device is determined to be sufficiently close to the contact, then the reminder may be triggered.

The determination regarding whether the electronic device 201 is sufficiently close to the contact may be made by comparing the distance between the electronic device and the contact's location to a threshold. This threshold need not be the same for all contacts. More specifically, in some embodiments, the threshold used will depend on established norms for the contact. More specifically, if the contact is typically very far from the electronic device 201 (e.g. if the contact and the user of the device live and work in different cities than one another), then the threshold may be higher than if the contact is typically relatively close to the electronic device 201. Accordingly, the determination regarding whether the contact and the electronic device 201 are sufficiently close to one another to trigger a reminder may be based on established norms. Using this technique, a reminder for an action item associated with an out-of-town contact may be triggered when that contact is in town, but a reminder for an action item associated with a co-worker who works near the user of the electronic device may not be triggered when that co-worker is in town. Instead, for the co-worker, the threshold may be much smaller before the reminder is triggered.

In other embodiments, instead of relying on a location sharing service to determine whether the contact is sufficiently close to the electronic device 201 to trigger the reminder, the manager application 226 may rely on an address (such as a home address or work address) associated with the contact which is defined in a contact record for that contact. More specifically, the electronic device 201 may identify its own current position using the location sensor 261 and may identify an address associated with the contact from a contact record for that contact. The electronic device 201 may then identify a possible interaction based on the current position of the electronic device 201 and the address. More specifically, the manager application 226 may determine whether the electronic device is currently sufficiently close to the address. This determination may be made, for example, by comparing the distance between the electronic device and the contact's address to a threshold. As noted above, the threshold need not be the same for all contacts and may be based on established norms (i.e. typical distances between the electronic device 201 and the address). If the electronic device 201 is determined to be sufficiently close to the address, the reminder may be triggered.

In some embodiments, the manager application 226 may identify possible interactions with the contact by identifying planned travel to a region associated with the contact. For example, the manager application 226 may scan emails received at the electronic device 201 and may identify emails which contain travel itinerary information. Such emails may, for example, specify hotel reservation information, flight information, or other types of reservation information. When travel is planned to a region associated with the contact (such as a city where the contact resides), then the reminder may be triggered.

In at least some embodiments, the manager application 226 may not, itself, scan emails to identify travel information. Instead, the manager application 226 may rely on another application, such as Blackberry Travel™ which reviews such emails and which identifies trips and shares such information with the manager application 226.

In some embodiments, the manager application 226 may identify planned travel to a region associated with the contact by comparing a destination address input into a navigation application (such as Google Maps™ or another mapping application which provides navigation functions) to an address or location associated with the contact. For example, when a user requests directions to a location which is near the contact's location or address, then a reminder may be triggered.

Other techniques may be used to identify actual or possible interactions with the contact associated with the action item. For example, in at least some embodiments, the manager application 226 may monitor a calendar and may identify a possible interaction with the contact if an appointment is scheduled with that contact. When such an appointment is identified, a reminder may be triggered.

Similarly, in at least some embodiments, the manager application 226 may monitor communications on the electronic device 201 and may trigger the reminder if a communication with the contact associated with the action item is identified. For example, when a phone call is placed to or received from the contact, the reminder may be triggered. Where an email is being composed to the contact (i.e. if the contact is listed as a recipient), then the reminder may be triggered. If a text message is composed to the contact, then the reminder may be triggered. If an instant messaging conversation is occurring with the contact, then the reminder may be triggered.

In some embodiments, a reminder condition which is used to trigger a reminder may be based on a "where" context item which specifies a location associated with the action item. That is, a reminder condition used to trigger a reminder may comprise a location associated with the action item. In at least some such embodiments, a reminder may be triggered based on the location associated with the action item and also based on the current or future location of the electronic device (and/or its user). For example, the reminder may be triggered when the electronic device 201 (or the user) is determined to be close to the location associated with the action item or may be triggered when the user is planning on being close to the location.

The current or future location of the electronic device 201 or the user may be determined according to any of the methods described above. More specifically, a location sensor 261 may be utilized or planned travel may be identified by scanning emails or by monitoring requests for directions in a navigation application. The determination as to whether the electronic device 201 is currently or is expected to be close enough to the location associated with the action item to cause the reminder to be triggered may be made using one or more thresholds (e.g. if the current or planned distance between the device and the location is less than a threshold, then the reminder may be triggered). These thresholds may not be the same for all locations. More specifically, the threshold required to trigger a location-based reminder may be based on established norms. That is, the threshold may depend on the typical distance between the electronic device (or user) and the location. In this way, when a user travels to a faraway place, the threshold may be larger than when they are in their hometown.

In some embodiments, a reminder condition which is used to trigger a reminder may be based on a "what" context item which identifies content associated with the action item. For example, when an action item is associated with content, such as stored content 301 on the electronic device 201, the manager application 226 may monitor access to that content. When a user accesses the content associated with an action item, then a reminder may be triggered. For example, where the content is video or audio, when a user begins to play that audio or video back, then the reminder may be triggered. Similarly, when the content is an email message, when the user views that email message, then the reminder may be triggered.

When the reminder is triggered (at 1102), a visual, audible or vibratory reminder may be generated on the electronic device 201. For example, in some embodiments, the electronic device 201 may display a display screen which identifies the action item which the user is being reminded of. In at least some embodiments, a user may be permitted to mark the action item as completed or may be permitted to dismiss the reminder.

Where the action item was created based on stored content 301 (i.e. content stored locally on the electronic device such as a video, audio file, word-processor document, electronic book or image), then the reminder of the action item may provide access to the stored content. For example, the reminder may display the content 301 or may provide a link for accessing the content.

In some embodiments, multiple reminder conditions may be associated with the same action item. That is, two or more reminder conditions may exist for triggering a reminder for the same action item. These reminder conditions may operate cooperatively or independently. That is, in some embodiments, a reminder may be triggered when conditions corresponding to the two or more reminder conditions are determined to exist. That is, conditions corresponding to all of the reminder conditions for an action item may be a pre-condition for triggering the reminder. In other embodiments, while an action item may be associated with multiple reminder conditions, these reminder conditions may operate independently. A reminder may be triggered when a condition corresponding to any one of the reminder conditions is determined to exist.

Sentence/Summary Generation

As noted previously, in some embodiments, a summary of an action item 300 may be automatically generated. In at least some embodiments, a sentence may be automatically generated based on context items associated with an action item (such as the "who", "what", "where", "why" and "when" context items). Such a sentence may summarize the action item to allow a user to easily understand the nature of the action item. That is, the sentence provides an at-a-glance summary of the action item.

Figure 12:
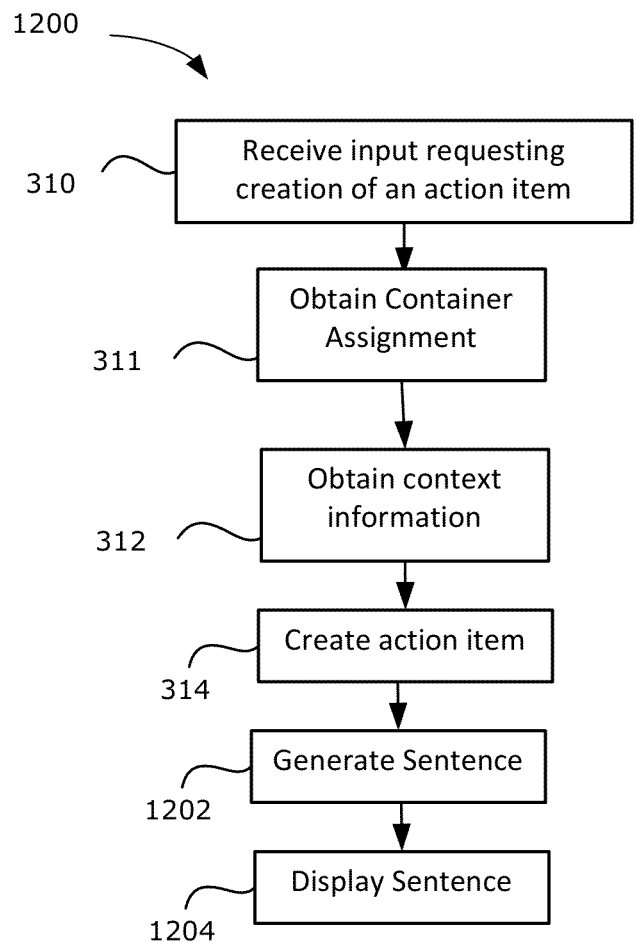
FIG. 12 is a flowchart of an example method of generating a sentence in accordance with example embodiments of the present disclosure.

Referring now to FIG. 12, a flowchart of an example method 1200 of generating such a sentence is illustrated. The method 1200 may, in at least some embodiments, be performed by the manager application 226. More particularly, the manager application 226 (and/or another application 224) may contain computer-readable instructions which, when executed, cause the processor 240 of the electronic device 201 to perform the method 1200 described below.

The method 1200 includes various operations and features (310, 311, 312, 314) which were described above with reference to the method 308 of FIG. 2. To avoid repetition, similar numerals have been used to indicate the same or similar features or operations of the methods 308 and 1200. Accordingly, such operations and features may operate as described above with reference to FIG. 2.

First, at 310, input is received requesting creation of an action item. Such input may be received in the manner described above with reference to FIG. 2. At 311, a container assignment for the action item is obtained. This container assignment may be obtained in the manner described above with reference to FIG. 2.

At 312, context information associated with the action item is obtained. 312 may be performed as described above with reference to FIG. 2 and, at 314, an action item may be created in the manner described above with reference to FIG. 2. At 1202, a sentence describing the action item may be automatically generated based on the context information associated with the action item. More particularly, the context information may include one or more context items. Each context item may define context information of a separate context type. For example, as noted above, any one or combination of the following context items may be included in the context information: "who". "what", "why", "when", "where" context items.

In at least some embodiments, a sentence may be generated to include context information specifying the reason why the action item was created (i.e. to include the context information associated with the "why" context item). In at least some embodiments, the manager application 226 may generate a sentence which includes a causal conjunction (such as "because" or "since") before the context item specifying the reason why the action item is was created, if such a causal conjunction is not already included in the reason why. For example, if the "why" context item contains the text "it is interesting", then a sentence may be generated which includes the phrase "because it is interesting".

In at least some embodiments, the sentence may be generated to include a verb which is automatically selected based on an action item type of the action item. The action item type may be based on the content 301 which is associated with that action item. Accordingly, in at least some embodiments, the manager application may identify an action item type associated with the action item based on the content 301 which is associated with that action item. If the content 301 associated with the action item is a document, then the verb may be "read" or "review". If the content 301 associated with the action item is a video (i.e. if the action item type is "video"), then the verb may be "watch". If the content 301 associated with the action item is audio, then the verb may be "listen". If the content 301 associated with the action item is an electronic message, such as an email message, then the verb may be "reply", "read", "review", etc. If the content 301 associated with the action item is an image, then the verb may be "review", "look", "enjoy", etc. Accordingly, the selection of a verb for use in the sentence may depend on the type of content associated with the action item.

In at least some embodiments, the sentence may be generated to include the context information in the "who" context item. That is, the sentence may be generated to include the context item specifying one or more persons associated with the action item. The sentence may also be generated to automatically include a preposition preceding the "who" context item. For example, a preposition which conveys involvement may be selected for inclusion in the sentence before the "who" context item. For example, the preposition may be "to" (e.g. to Bill) or "with" (e.g. with Bill). Such prepositions may not be included in all embodiments. For example, in some embodiments, a verb which conveys involvement of another party may be included before the contact is listed. For example, a sentence may include "contact Bill." The term "contact" conveys the fact that Bill's involvement may be necessary or useful for completion of the action item.

In at least some embodiments, the sentence may be generated to include the context information in the "when" context item. That is, the sentence may be generated to automatically include a context item specifying timing information associated with the action item. In at least some embodiments, the automatically generated sentence may include a preposition of time before the context item specifying the timing information. For example, a preposition such as "before", "by", or "on" may be included in the sentence before the "when" context item. For example, if the "when" context item specifies a precise date such as "Jul. 10, 2012", then the sentence may include "before Jul. 10, 2012."

In at least some embodiments, the sentence may be generated to include context information specifying a location associated with the action item (such as the "where" context item). In at least some embodiments, a preposition of place may be included in the sentence before the location. For example, "in" or "at" may be included in the sentence before the location e.g. "at home", "at Toronto, Ontario", etc.

In at least some embodiments, the action item 300 may be associated with content 301, such as locally stored content. For example, the content may be video, audio, a document, etc. In at least some such embodiments, the sentence may be generated to include a content identifier as an object of the sentence. The object of a sentence denotes somebody or something involved in the subject's performance of the verb of the sentence. That is, the object of the sentence is what the verb is acting on.

The content identifier identifies the content associated with the action item. For example, if the content is video, then the content identifier may be the name of the video (such as a movie name, TV show name and/or episode name, etc.). Similarly, if the content is an audio file, then the content identifier may be the name of the audio file (such as a song name, album name, author name, etc.). If the content is a document, then the content identifier may be the title of the document. The content identifier may, for example, be automatically generated based on metadata associated with the content.

The sentence may be generated to include two or more context items. That is, two or more of the "what", "who", "where", "why" or "when" context items may be used to generate the sentence.

After the sentence is generated, at 1204 of the method 1200 of FIG. 12, the sentence may be displayed as a summary 1002 (FIG. 10) on the display 204 (FIG. 1). An example of one such summary 1002 is illustrated in FIG. 10. The summary 1002 may be displayed together with an option 1004 to edit the summary. In at least some embodiments, selection of the option 1004 to edit the summary may cause a display screen similar to the display screen 500 of FIG. 5 to be displayed, which allows a user to modify context items associated with that action item. Modifying a context item may cause the sentence to be automatically updated to account for the changes to the context item.

Figure 13:
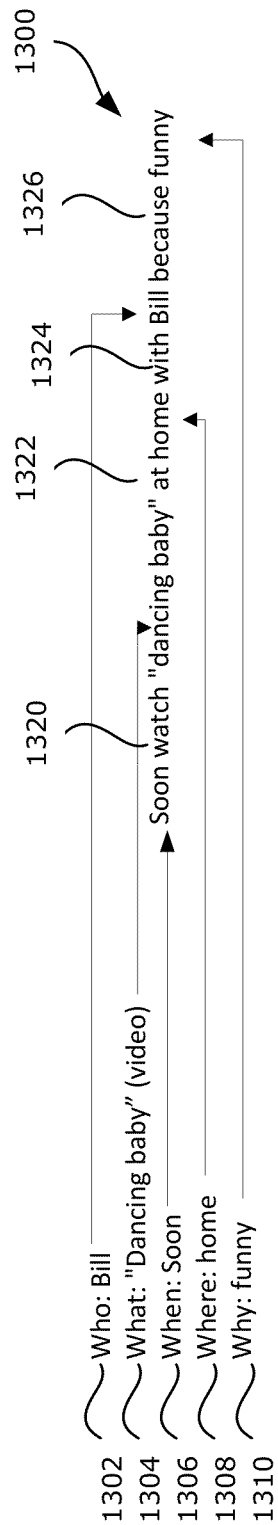
FIG. 13 illustrates an example sentence generated according to example embodiments of the present disclosure.

Referring now to FIG. 13, an example sentence 1300 is illustrated. FIG. 13 illustrates how context items may be used to generate a sentence 1300. More specifically, FIG. 13 illustrates how a "who" context item 1302 (e.g. Bill), a "what" context item 1304 (e.g. "Dancing baby", which is a video), a "when" context item 1306 (e.g. "soon"), a "where" context item 1308 (e.g. "home") and a "why" context item 1310 (e.g. "funny") may be used in a sentence 1300. In the example illustrated, the sentence is "Soon watch "dancing baby" at home with Bill because funny". A verb 1320 is generated and used in the sentence based on the type of content associated with the action item. In the example illustrated, the content is a video and so the verb is "watch." The verb is automatically inserted before a content identifier "dancing baby." which is included as an object of the sentence. A preposition of place 1322 (e.g. "at") is automatically inserted before the location defined by the "where" context item 1308 (e.g. at home). A preposition 1324 which conveys involvement (e.g. "with") is included in the sentence before the "who" context item 1302 which lists a contact associated with the action item. A causal conjunction 1326 (e.g. "because") is included in the sentence before the "why" context item 1310 (e.g. "funny").

Figure 14:
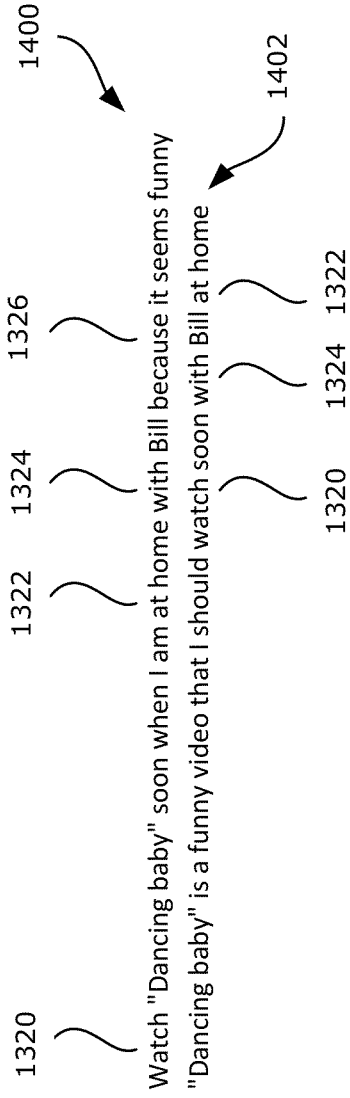
FIG. 14 illustrates example sentences generated according to example embodiments of the present disclosure.

Referring now to FIG. 14, two alternative sentences 1400, 1402 are illustrated. These sentences are generated based on the same context items as the sentence of FIG. 13. The first alternative sentence 1400 is "Watch "Dancing baby" soon when I am at home with Bill because it seems funny." The second alternative sentence 1402 is ""Dancing baby" is a funny video that I should watch soon with Bill at home." These alternative sentences illustrate how the order of the various context items within the sentence may be altered to create a different sentence and how some of the features described above need not be included in all sentences. For example, the second alternative sentence 1402 does not include a causal conjunction 1326 before the "why" context item 1310.

While the present application is primarily described in terms of methods, a person of ordinary skill in the art will understand that the present application is also directed to various apparatus such as an electronic device 201 including a mobile communications device. The electronic device 201 includes components for performing at least some of the aspects and features of the described methods, which may be by way of hardware components (such as the memory 244 and/or the processor 240), software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present application.

The term "computer readable medium" as used herein means any medium which can store instructions for use by or execution by a computer or other computing device including but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

Example embodiments of the present application are not limited to any particular operating system, system architecture, mobile device architecture, server architecture, or computer programming language.

The various example embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is:

1. A processor-implemented method performed at an electronic device, the method comprising:
   receiving, via an input interface associated with the electronic device, a request for creation of an action item, the action item comprising a record of a proposed future action;
   obtaining context information associated with the action item;
   storing the action item and context information in a memory associated with the electronic device;
   generating a sentence describing the action item based on the context information associated with the action item;
   detecting a reminder condition; and
   in response to detecting the reminder condition, displaying the sentence on a display of the electronic device.

2. The method of claim 1, wherein the context information includes one or more context items, each context item defining context information of a separate context type.

3. The method of claim 1, wherein the context information includes a context item specifying a reason for creating the action item.

4. The method of claim 3, wherein generating a sentence describing the action item based on the context information associated with the action item comprises:
   generating a sentence which includes the context item specifying the reason for creating the action item and which includes a causal conjunction before the context item specifying the reason for creating the action item.

5. The method of claim 3, further comprising:
   displaying a prompt requesting input of the reason for creating the action item.

6. The method of claim 1, further comprising:
   identifying an action item type associated with the action item, and
   wherein generating the sentence comprises generating a verb for inclusion in the sentence based on the action item type.

7. The method of claim 6, wherein, if the action item type associated with the action item is a video, then the verb is 'watch'.

8. The method of claim 1, wherein the context information includes a context item specifying one or more persons associated with the action item.

9. The method of claim 8, wherein generating a sentence describing the action item based on the context information associated with the action item comprises:
   generating a sentence which includes the context item specifying the one or more persons and which also includes a preposition preceding the context item specifying the one or more persons.

10. The method of claim 1, wherein the context information includes a context item specifying timing information associated with the action item and wherein generating a sentence describing the action item based on the context information associated with the action item comprises generating a sentence which includes the timing information.

11. The method of claim 1, wherein the context information includes a context item specifying a location associated with the action item and wherein generating a sentence describing the action generating a sentence which includes the location.

12. The method of claim 1, wherein the action item based on the context information associated with the action item comprises generating a sentence which includes the location information.

13. The method of claim 1, wherein the action item is associated with and wherein generating a sentence describing the action item based on the context information associated with the action item comprises including a content identifier as an object of the sentence.

14. The method of claim 13, wherein the request for creation of an action item is a request to create an action item based on stored content and wherein the content identifier is automatically generated based on metadata associated with the stored content.

15. The method of claim 1, wherein the context information includes two or more context items, each context item defining context information of a separate context type and wherein generating a sentence describing the action item based on the context information associated with the action item comprises generating the sentence based on the two or more context items.

16. The method of claim 1, further comprising:
displaying the sentence together with content associated with the action item.

17. An electronic device comprising:
a processor;
a display coupled with the processor; and
a memory coupled with the processor, the memory comprising processor-executable instructions which, when executed, cause the processor to:
receive a request for creation of an action item, the action item comprising a record of a proposed future action;
obtain context information associated with the action item;
store the action item and context information; and
generate a sentence describing the action item based on the context information associated with the action item
detect a reminder condition; and
in response to detecting the reminder condition, display the sentence on the display.

18. The electronic device of claim 17, wherein the context information includes one or more context items, each context item defining context information of a separate context type.

19. The electronic device of claim 17, wherein the context information includes a context item specifying a reason for creating the action item.

20. The electronic device of claim 19, wherein generating a sentence describing the action item based on the context information associated with the action item comprises:
generating a sentence which includes the context item specifying the reason for creating the action item and which includes a causal conjunction before the context item specifying the reason for creating the action item.

21. A non-transitory computer readable storage medium comprising computer executable instructions for:
receiving, via an input interface associated with an electronic device, a request for creation of an action item, the action item comprising a record of a proposed future action;
obtaining context information associated with the action item;
storing the action item and context information in a memory associated with the electronic device;
generating a sentence describing the action item based on the context information associated with the action item;
detecting a reminder condition; and
in response to detecting the reminder condition, displaying the sentence on a display of the electronic device.

* * * * *